United States Patent [19]

Fahrion

[11] 4,440,426

[45] Apr. 3, 1984

[54] DUCT CONNECTOR

[76] Inventor: Karl Fahrion, 1000 Constance St., Pittsburgh, Pa. 15212

[21] Appl. No.: 342,349

[22] Filed: Jan. 25, 1982

Related U.S. Application Data

[63] Continuation of Ser. No. 147,467, May 7, 1980, abandoned.

[51] Int. Cl.$^3$ .............................................. F16L 33/00
[52] U.S. Cl. ..................................... 285/239; 285/382
[58] Field of Search ......... 285/239, 240, 259, DIG. 4, 285/382, 241, 397, 238

[56] References Cited

U.S. PATENT DOCUMENTS

| 216,851 | 6/1879 | Hofmann | 285/259 X |
| 567,962 | 9/1896 | Cooper | 285/239 |
| 589,216 | 8/1897 | McKee | 285/259 X |
| 2,807,432 | 9/1957 | Parker et al. | 285/239 X |
| 2,864,378 | 12/1958 | Schneller et al. | 285/239 X |
| 3,221,746 | 12/1965 | Noble | 285/239 X |
| 3,224,794 | 12/1965 | Crissy | 285/259 X |
| 3,233,923 | 2/1966 | Raider et al. | 285/239 |

FOREIGN PATENT DOCUMENTS

| 1216808 | 4/1960 | France | 285/239 |
| 277765 | 12/1951 | Switzerland | 285/239 |
| 741643 | 12/1955 | United Kingdom | 285/259 |

Primary Examiner—Thomas F. Callaghan
Attorney, Agent, or Firm—Reed, Smith, Shaw & McClay

[57] ABSTRACT

Apparatus for connecting flex duct to a sheet metal collar wherein piercing members are connected to the sheet metal collar. The piercing members are located adjacent one end of the sheet metal collar with the end of the piercing member next adjacent the end of the collar connected to the collar. The piercing members have an apical end that is oppositely disposed from the end connected to the sheet metal collar such that, when the flex duct is forced over the piercing member and then drawn in the opposite direction, the apical end pierces the scrim of the flex duct and the piercing member entraps the wire helix to secure the collar to the flex duct.

6 Claims, 3 Drawing Figures

DUCT CONNECTOR

This is a continuation of application Ser. No. 147,467 filed May 7, 1980, abandoned.

BACKGROUND OF THE INVENTION

The subject invention is directed to methods and apparatus for connecting duct and, more specifically, methods and apparatus for connecting flex duct and sheet metal collars.

DESCRIPTION OF THE PRIOR ART

For many years, heating, cooling and ventilation duct was almost universally made of molded or formed sheet metal. One problem with such metal ducts was that they were difficult to install. Due to the labor required, such duct also became relatively expensive to install as labor costs increased. In attempting to overcome these problems, various devices were tried in connecting lengths of the duct together or to sheet metal fittings. Examples of methods used in the prior art are illustrated in U.S. Pat. Nos. 139,841; 338,877; 605,263; 1,485;400; 1,301,565; 1,451,887; 1,661,674; and 2,537,284.

A partial solution to the difficulty and expense of installing metal ducts was afforded by the development of flexible ducts in which a flexible fabric or plastic "scrim" is carried on a wire helix support. This flexible duct is generally available in lengths of 5 to 25 feet and is easily bent around corners or obstructions. It thus obviates many of the problems presented by the fitted angles and turns required for metal ducts. This flexible duct has quickly been accepted with industry with most applications being connections between the main air supply duct and air diffusers, although many other uses are also made.

Although flexible or "flex" duct obviated many of the problems caused by cutting and fitting metal duct, it required a mechanism for connecting the flexible duct to metal diffusers and collars as well as to additional lengths of flexible duct. In the prior art, conventional methods that had previously been used to connect the metal duct were applied to connect adjoining lengths of flex duct or to connect the flex duct to sheet metal fittings. For example, a typical way of connectig flex duct and metal duct was to internally coat one end of the flex duct with sealer and then thread the metal duct into the flex duct. The joint between the ducts was then wrapped with tape. In another method, lengths of flex duct were connected together by internally coating the ends of the duct with sealer, fastening the duct onto opposite ends of an internal sleeve with screws, and taping the seam between the abutting ends of the duct. Alternatively, strap clamps were used in place of metal screws.

All these prior methods required special tools and considerable labor. In certain applications, they were difficult or impossible to perform. Accordingly, there was a need in the prior art for a method and apparatus by which flexible duct could be securely and quickly connected to sheet metal fittings or other lengths of duct.

SUMMARY OF THE INVENTION

In accordance with the subject invention, a sheet metal collar is provided with piercing members. The piercing members are located adjacent one end of the sheet metal collar and are connected to the collar by the end of the piercing member next adjacent the end of the collar. The piercing members have an apical end disposed oppositely from the end of the collar such that the apical end will pierce the scrim of the flex duct when the duct is passed over the piercing member and then drawn in the opposite direction.

Preferably, the apical end of the piercing member can be folded between the collar and the base of the piercing member.

Other details, objects and advantages of the invention will become apparent as the following description of certain presently preferred embodiments thereof proceeds.

BRIEF DESCRIPTION OF THE DRAWINGS

The accompanying drawings show certain presently preferred embodiments of the invention in which.

DESCRIPTION OF THE PREFERRED EMBODIMENT

Figure 1:
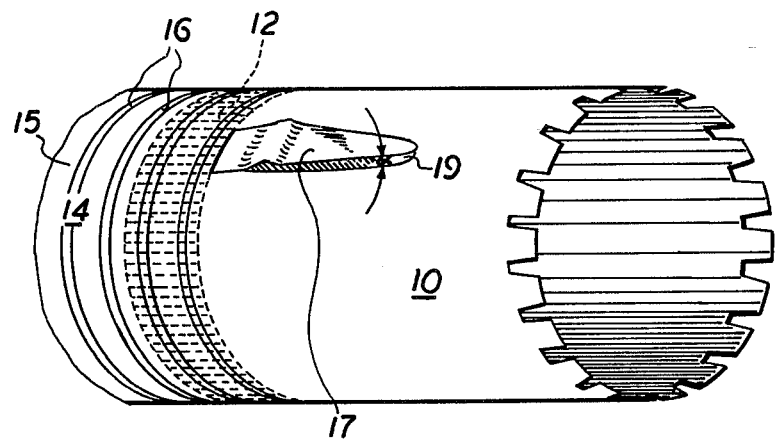
FIG. 1 is a perspective view of a sheet metal collar with piercing members in accordance with the subject invention.
Figure 2:
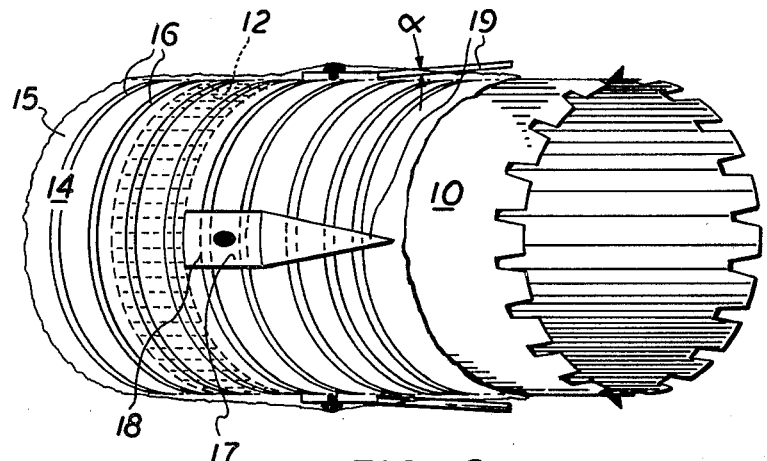
FIG. 2 is a perspective view of a sheet metal collar connected to flex duct in accordance with the subject invention.
Figure 3:
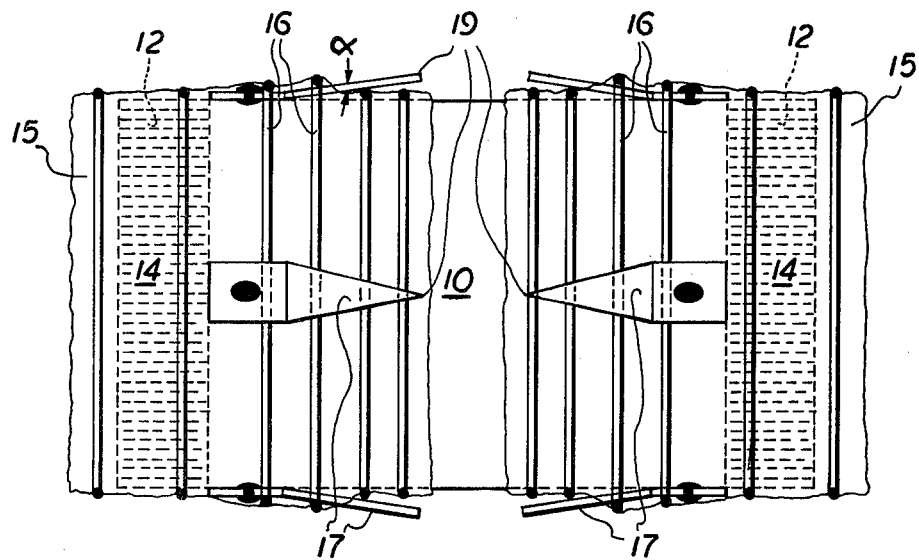
FIG. 3 is an elevation view of a sheet metal collar connected to adjacent lengths of flex duct.

As shown in the preferred embodiment of FIG. 1, the subject invention includes a duct collar such as sheet metal collar 10 having at least one end 12 adapted to engage flex duct 14. Flex duct 14 includes scrim 15 and wire helix 16. Piercing members 17 are fastened to the outer surface of collar 10 at the end of the piercing member adjacent collar end 12. Piercing member 17 can be fastened to collar 10 directly as shown in FIG. 1, or by means of a flange 18 as shown in FIGS. 2 and 3.

An apical end 19 of piercing member 17 that is oppositely disposed from end 12 is formed in an apex such that it will pierce the scrim 15 of flex duct 14 as hereafter more fully explained. Preferably, apical end 19 is formed in a tip for which the radius of curvature is less than ¾ inch and, most preferably in the range of 1/64 to ¼ inch.

Piercing member 17 is generally inclined with respect to the outer surface of collar 10. Preferably, the angle of inclination (a) is less than 50 degrees and, most preferably, in the range of 1 to 22 degrees. Also preferably, piercing members 17 are substantially straight along a major axis Y and are disposed on collar 10 such that the major axis thereof intersects the central longitudinal axis Z of collar 10. As an alternative embodiment, piercing member 17 can be stamped into the connector such that it can be either not used or knocked out as may be required for the particular application.

Preferably, collar 10 is provided with at least two piercing members 17. More preferably, when flex duct 14 is nine to twelve inches in diameter, collar 10 is provided with at least three piercing members and when flex duct 14 is greater than 12 inches in diameter collar 10 is provided with at least four piercing members.

To connect collar 10 with flex duct 14, end 12 of collar 10 is inserted within flex duct 14. Flex duct 14 is then forced longitudinally over collar 10 in the direction shown by arrow A until at least one, and preferably two or three, turns of wire helix 16 are passed over apical ends 19 of piercing members 17. Flex duct 14 is then drawn in the opposite direction shown by arrow B such that apical ends 19 of piercing members 17 pierce the scrim 15 of flex duct 14 and the turns of the wire helix 16 become lodged between collar 10 and piercing members 17. Flex duct 14 and collar 10 are thus firmly secured. Optionally, and most preferably where the radius of curvature of apical end 19 is small, apical end 19 is thereafter folded between piercing members 17 and collar 10 so that apical end 19 is not exposed.

Accordingly, the subject invention provides a strong connection between flex duct 14 and collar 10 that can be made simply and more quickly than by prior apparatus or methods. In addition, the connection as herein shown and described has been found to be substantially stronger than any flex connection apparatus or methods known in the prior art.

While certain presently preferred embodiments of the invention have been shown and described, it is to be understood that the invention is not limited thereto but may be otherwise variously embodied within the scope of the following claims.

I claim:

1. Apparatus for connecting flexible duct to sheet metal components, said flexible duct having a flexible scrim material that is supported on a wire helix, said apparatus comprising:

a tubular sheet metal collar adapted on one end for longitudinal insertion into the flexible duct; and piercing members having a first end connected to said collar adjacent the end thereof and having an apical end that is oppositely disposed from the one end of the collar, the apical ends of said piercing members being located on the outside of the scrim and the first end of said piercing members being located on the inside of the scrim with the wire helix being secured between piercing member and said collar, whereby a connection is made by forcing the flexible duct over the collar and then drawing the flexible duct in a direction such that the apical ends of the piercing members pierce the scrim.

2. The flexible duct connector of claim 1 wherein the radius of curvature of said apical end is less than ¼ inch.

3. The flexible duct connector of claim 10 wherein the radius of curvature of said apical end is in the range of 1/64 to ¼ inch.

4. The flexible duct connector of claim 1 wherein said piercing member is inclined with respect to the surface of said collar such that the angle of inclination of said piercing member with respect to the surface of the collar is less than 50 degrees.

5. The flexible duct connector of claim 1 wherein said piercing member is inclined with respect to the surface of said collar such that the angle of inclination of said piercing member with respect to the surface of the collar is in the range of 1 to 22 degrees.

6. The flexible duct connector of claim 10 wherein the connection between the piercing members and the collar includes;

flange members connected to the outer surface of the collar and said piercing members respectively connected to the side of said flange members that is opposite the engaging end of said collar, said piercing members having an apical end oppositely disposed from the end connected to the flange members.

* * * * *